(12) United States Patent
Kramer et al.

(10) Patent No.: US 12,392,287 B2
(45) Date of Patent: Aug. 19, 2025

(54) STEAM COOLING TURBINE STATOR VANE ARRAY

(71) Applicant: Raytheon Technologies Corporation, Farmington, CT (US)

(72) Inventors: Stephen K. Kramer, Cromwell, CT (US); Lance L Smith, West Hartford, CT (US); Gregory Boardman, Owens Cross Roads, AL (US); Zhongtao Dai, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/121,377

(22) Filed: Mar. 14, 2023

(65) Prior Publication Data
US 2024/0309813 A1  Sep. 19, 2024

(51) Int. Cl.
*F02C 7/12* (2006.01)
*F02C 7/141* (2006.01)
*F02C 7/16* (2006.01)

(52) U.S. Cl.
CPC ............... *F02C 7/141* (2013.01); *F02C 7/16* (2013.01); *F05D 2240/12* (2013.01); *F05D 2260/212* (2013.01); *F05D 2260/2322* (2013.01); *F05D 2270/16* (2013.01)

(58) Field of Classification Search
CPC .... F02C 7/141; F02C 7/16; F02C 7/18; F01D 5/187; F01D 5/188; F01D 9/065; F05D 2240/12; F05D 2240/121; F05D 2240/122; F05D 2260/212; F05D 2260/2322; F05D 2270/16
See application file for complete search history.

(56) References Cited

U.S. PATENT DOCUMENTS

| | | | |
|---|---|---|---|
| 4,384,452 A | | 5/1983 | Rice |
| 5,120,192 A | * | 6/1992 | Ohtomo ................. F01D 5/189 |
| | | | 415/115 |
| 5,253,976 A | * | 10/1993 | Cunha ..................... F02C 7/16 |
| | | | 415/48 |
| 5,340,274 A | | 8/1994 | Cunha |
| 6,264,426 B1 | | 7/2001 | Fukuno |

(Continued)

FOREIGN PATENT DOCUMENTS

DE    10205972 A1    10/2003

OTHER PUBLICATIONS

EP search report for EP24163595.2 dated Jul. 26, 2024.

*Primary Examiner* — Devon C Kramer
*Assistant Examiner* — Sean V Meiller
(74) *Attorney, Agent, or Firm* — Getz Balich LLC (57) ABSTRACT

An assembly is provided for a turbine engine. This assembly includes a turbine vane array and a cooling system. The turbine vane array includes an inner platform, an outer platform and a plurality of turbine vanes extending between and connected to the inner platform and the outer platform. The turbine vanes include a first turbine vane, and the first turbine vane includes a first passage and a second passage. The cooling system is configured to direct a first fluid into the first passage and a second fluid into the second passage. The first fluid includes air and steam during a first mode. The second fluid includes the air without the steam during the first mode.

17 Claims, 11 Drawing Sheets

(56) References Cited

U.S. PATENT DOCUMENTS

| | | | | |
|---|---|---|---|---|
| 6,612,114 B1 * | 9/2003 | Klingels | ............... | F02C 7/18 |
| | | | | 60/785 |
| 7,040,097 B2 | 5/2006 | Mukherjee | | |
| 9,145,774 B2 | 9/2015 | Fuchs | | |
| 9,334,803 B2 | 5/2016 | Intile | | |
| 2005/0031444 A1 | 2/2005 | Pothier | | |
| 2013/0061600 A1 * | 3/2013 | Anand | ................ | F02C 7/18 |
| | | | | 60/785 |

* cited by examiner

STEAM COOLING TURBINE STATOR VANE ARRAY

BACKGROUND OF THE DISCLOSURE

1. Technical Field

This disclosure relates generally to a turbine engine and, more particularly, to utilizing steam during operation of the turbine engine.

2. Background Information

As government emissions standards tighten, interest in alternative fuels for gas turbine engines continues to grow. There is interest, for example, in fueling a gas turbine engine with hydrogen ($H_2$) fuel rather than a traditional hydrocarbon fuel such as kerosine to reduce greenhouse emissions. Combustion products produced by combusting hydrogen ($H_2$) fuel include water vapor. Various systems and methods are known in the art for recovering the water vapor. Various system and methods are also known in the art for producing and utilizing steam from the recovered water vapor. While these known systems and methods have various advantages, there is still room in the art for improvement.

SUMMARY OF THE DISCLOSURE

According to an aspect of the present disclosure, an assembly is provided for a turbine engine. This assembly includes a turbine vane array and a cooling system. The turbine vane array includes an inner platform, an outer platform and a plurality of turbine vanes extending between and connected to the inner platform and the outer platform. The turbine vanes include a first turbine vane, and the first turbine vane includes a first passage and a second passage. The cooling system is configured to direct a first fluid into the first passage and a second fluid into the second passage. The first fluid includes air and steam during a first mode. The second fluid includes the air without the steam during the first mode.

According to another aspect of the present disclosure, another assembly is provided for a turbine engine. This assembly includes a turbine vane array, a structure and a steam injector. The turbine vane array includes an inner platform, an outer platform and a plurality of turbine vanes extending between and connected to the inner platform and the outer platform. The turbine vanes include a first turbine vane. The first turbine vane includes a sidewall, a passage and a plurality of cooling apertures. The passage extends within the first turbine vane along the sidewall. The cooling apertures extend through the sidewall and are fluidly coupled with the passage. The structure forms an air plenum with the outer platform. The air plenum is radially outboard of the outer platform and is fluidly coupled with the passage through an inlet to the passage in the outer platform. The steam injector is configured to direct steam into the passage. A tip of the steam injector is disposed at the inlet to the passage.

According to still another aspect of the present disclosure, another assembly is provided for a turbine engine. This assembly includes a combustor, a vane array and a cooling system. The combustor includes a combustion chamber. The vane array is arranged at an outlet from the combustion chamber. The vane array includes an inner platform, an outer platform and a plurality of vanes. The inner platform forms an inner peripheral boundary of a flowpath through the vane array. The outer platform forms an outer peripheral boundary of the flowpath through the vane array. Each of the vanes extends across the flowpath from the inner platform to the outer platform. The vanes include a first vane with an internal passage. The cooling system is configured to direct a fluid into the internal passage. The fluid includes air and steam.

The fluid may include the air and the steam during a first mode of operation. The fluid may only include the air during a second mode of operation.

The passage may be a first passage, and the first turbine vane may also include a second passage discrete from the first passage. The air plenum may be fluidly coupled with the second passage through an inlet to the second passage in the outer platform.

The assembly may also include a turbine section. The turbine vane array may be arranged at an inlet to the turbine section.

The first fluid may include the air without the steam during a second mode. The second fluid may include the air without the steam during the second mode.

The cooling system may include a steam injector. A tip of the steam injector may be disposed at an inlet to the first passage. The cooling system may be configured to direct the steam into the first passage through the steam injector.

The cooling system may include a steam injector projecting partially into the first passage. The cooling system may be configured to direct the steam into the first passage through the steam injector.

The cooling system may include a steam rail extending within the first passage. The cooling system may be configured to direct the steam into the first passage through the steam rail.

The cooling system may include a plurality of steam injectors. The cooling system may be configured to direct the steam into the first passage through the steam injectors.

An air plenum may be disposed radially outboard of and formed by the outer platform. The cooling system may be configured to direct the air into the first passage through the air plenum.

The cooling system may be configured to direct the air into the second passage through the air plenum.

The first turbine vane may extend longitudinally between a leading edge and a trailing edge. The first passage may be arranged at the leading edge.

The first turbine vane may extend longitudinally between a leading edge and a trailing edge. The second passage may be arranged at the trailing edge.

The first turbine vane may extend longitudinally between a leading edge and a trailing edge. The first passage may be disposed longitudinally between the leading edge and the second passage.

The first passage may be fluidly discrete from the second passage within the first turbine vane.

The first passage may be fluidly coupled with a plurality of cooling apertures through a sidewall of the first turbine vane.

The assembly may also include a combustor, and the combustor may include a combustion chamber. The turbine vane array may be arranged at an outlet from the combustion chamber.

The inner platform may form an inner peripheral boundary of a flowpath through the turbine vane array. The outer platform may form an outer peripheral boundary of the flowpath through the turbine vane array. Each of the turbine vanes may extend across the flowpath between the inner platform and the outer platform.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
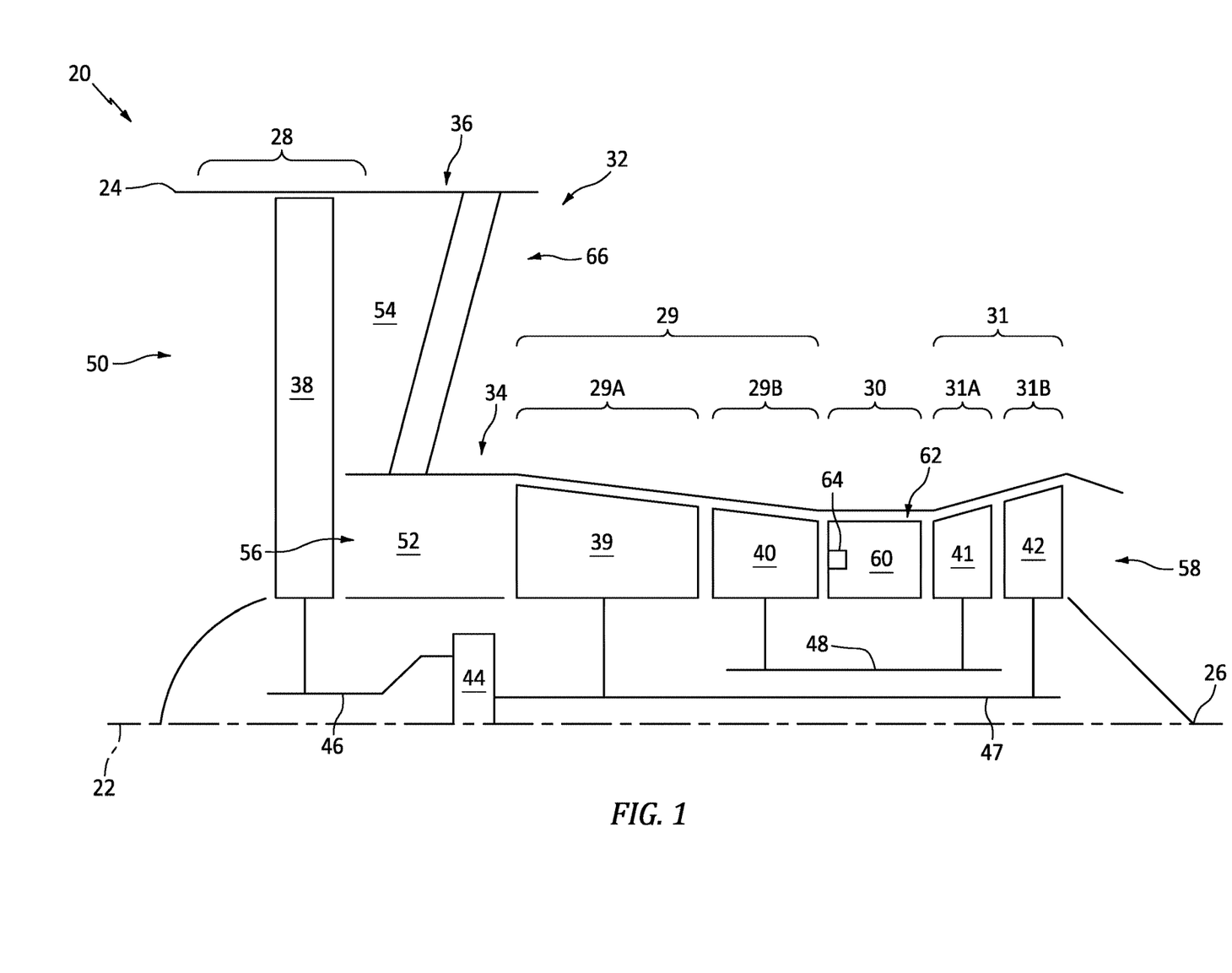
FIG. 1 is a partial schematic illustration of a gas turbine engine.

FIG. 1 is a side sectional illustration of a gas turbine engine 20 for an aircraft propulsion system. This turbine engine 20 extends axially along an axial centerline 22 between a forward, upstream end 24 and an aft, downstream end 26. The turbine engine 20 includes a fan section 28, a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B of FIG. 1 are arranged sequentially along the axial centerline 22 within an engine housing 32. This engine housing 32 includes an inner case 34 (e.g., a core case) and an outer case 36 (e.g., a fan case). The inner case 34 may house one or more of the engine sections 29A-31B; e.g., a core of the turbine engine 20. The outer case 36 may house at least the fan section 28.

Each of the engine sections 28, 29A, 29B, 31A and 31B includes a respective bladed rotor 38-42. Each of these bladed rotors 38-42 includes a plurality of rotor blades arranged circumferentially around and connected to one or more respective rotor disks and/or hubs. The rotor blades, for example, may be formed integral with or mechanically fastened, welded, brazed, adhered and/or otherwise attached to the respective rotor disk(s) and/or the respective hub(s).

The fan rotor 38 is connected to a geartrain 44, for example, through a fan shaft 46. The geartrain 44 and the LPC rotor 39 are connected to and driven by the LPT rotor 42 through a low speed shaft 47. The HPC rotor 40 is connected to and driven by the HPT rotor 41 through a high speed shaft 48. The engine shafts 46-48 are rotatably supported by a plurality of bearings; e.g., rolling element and/or thrust bearings. Each of these bearings is connected to the engine housing 32 by at least one stationary structure such as, for example, an annular support strut.

During engine operation, air enters the turbine engine 20 through an airflow inlet 50 into the turbine engine 20. This air is directed through the fan section 28 and into a core flowpath 52 and a bypass flowpath 54. The core flowpath 52 extends sequentially through the engine sections 29A-31B (e.g., the engine core) from an inlet 56 into the core flowpath 52 to an exhaust 58 from the core flowpath 52. The air within the core flowpath 52 may be referred to as "core air". The bypass flowpath 54 extends through a bypass duct, and bypasses the engine core. The air within the bypass flowpath 54 may be referred to as "bypass air".

The core air is compressed by the LPC rotor 39 and the HPC rotor 40 and directed into a (e.g., annular) combustion chamber 60 of a (e.g., annular) combustor 62 in the combustor section 30. Fuel is injected by one or more fuel injector assemblies 64 (one visible in FIG. 1) into the combustion chamber 60 and mixed with the compressed core air to provide a fuel-air mixture. This fuel-air mixture is ignited and combustion products thereof flow through and sequentially cause the HPT rotor 41 and the LPT rotor 42 to rotate before being directed out of the turbine engine 20 through the core exhaust 58. The rotation of the HPT rotor 41 and the LPT rotor 42 respectively drive rotation of the HPC rotor 40 and the LPC rotor 39 and, thus, compression of the air received from the core inlet 56. The rotation of the LPT rotor 42 also drives rotation of the fan rotor 38, which propels the bypass air through the bypass flowpath 54 and out of the turbine engine 20 through an exhaust 66 from the bypass flowpath 54. The propulsion of the bypass air may account for a majority of thrust generated by the turbine engine 20.

Figure 2:
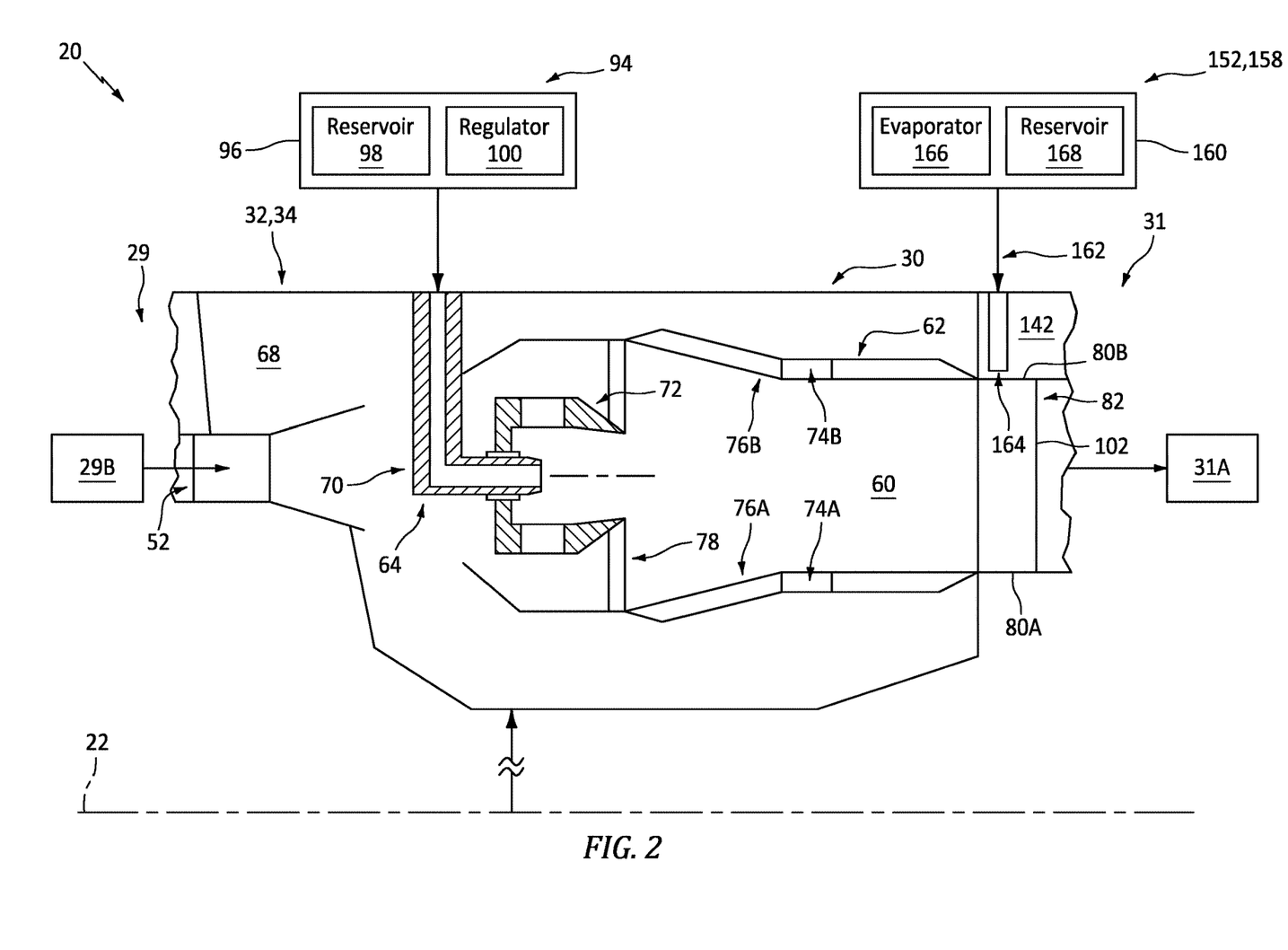
FIG. 2 is a partial schematic illustration of a combustor section between a compressor section and a turbine section.

FIG. 2 illustrate a portion of the combustor section 30 along the core flowpath 52 between the HPC section 29B and the HPT section 31A. This combustor section 30 includes the combustor 62, a diffuser plenum 68 and the one or more injector assemblies 64 (one visible in FIG. 2). Briefly, the combustor 62 is disposed within (e.g., surrounded by) the diffuser plenum 68. This diffuser plenum 68 receives the compressed core air from the HPC section 29B for subsequent provision into the combustion chamber 60. Each injector assembly 64 of FIG. 2 includes a fuel injector 70 mated with an air swirler structure 72. The fuel injector 70 injects the fuel into the combustion chamber 60. The air swirler structure 72 directs some of the core air from the diffuser plenum 68 into the combustion chamber 60 in a manner that facilitates mixing the core air with the injected fuel. One or more igniters (not shown) ignite the fuel-air mixture within the combustion chamber 60. One or more quench apertures 74A, 74B (generally referred to as "74") (e.g., dilution holes) in each wall 76A, 76B (generally referred to as "76") of the combustor 62 direct additional core air from the diffuser plenum 68 into the combustion chamber 60 to facilitate substantially complete burnout of (e.g., make stoichiometrically lean) the combustion products; e.g., the ignited fuel-air mixture.

Figure 3:
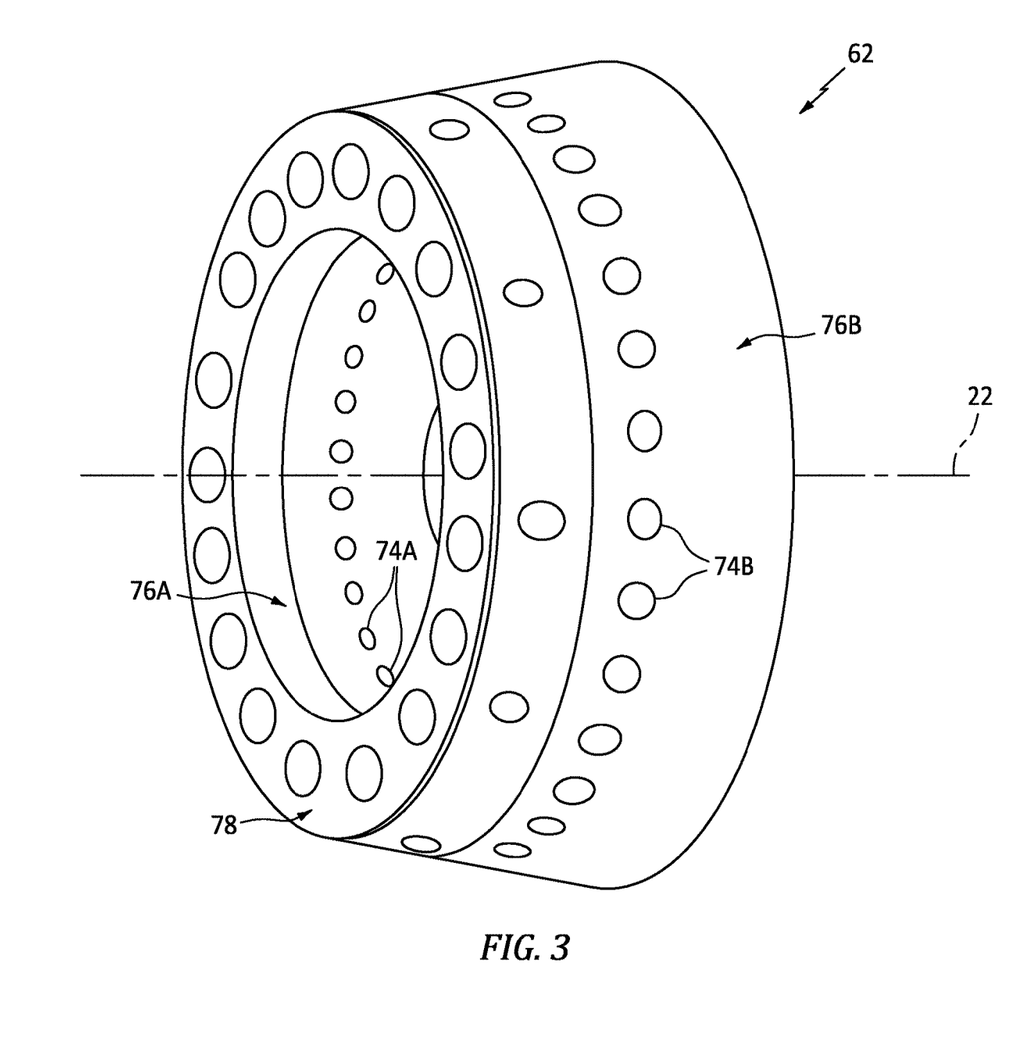
FIG. 3 is a perspective illustration of a combustor.

The combustor 62 may be configured as an annular combustor; e.g., an annular floating wall combustor. The combustor 62 of FIGS. 2 and 3, for example, includes an annular combustor bulkhead 78, the tubular inner combustor wall 76A ("inner wall"), and the tubular outer combustor wall 76B ("outer wall"). The bulkhead 78 of FIG. 2 extends radially between and to the inner wall 76A and the outer wall 76B. The bulkhead 78 may be connected (e.g., mechanically fastened or otherwise attached) to the inner wall 76A and/or the outer wall 76B. Each combustor wall 76 projects axially along the axial centerline 22 out from the bulkhead 78 towards the HPT section 31A. The inner wall 76A of FIG. 2, for example, projects axially to and may be connected to an (e.g., tubular) inner platform 80A of a downstream stator vane array 82 in the HPT section 31A. The outer wall 76B of FIG. 2 projects axially to and may be connected to an (e.g., tubular) outer platform 80B of the downstream stator vane array 82. With the arrangement of FIG. 2, the combustion chamber 60 is formed by and extends radially within the combustor 62 between and to the inner wall 76A and the outer wall 76B. The combustion chamber 60 is formed by and extends axially (in an upstream direction along the core flowpath 52) into the combustor 62 from the stator vane array 82 to the bulkhead 78. The combustion chamber 60 also extends within the combustor 62 circumferentially about (e.g., completely around) the axial centerline 22, which may configure the combustion chamber 60 as a full-hoop annulus.

Figure 4:
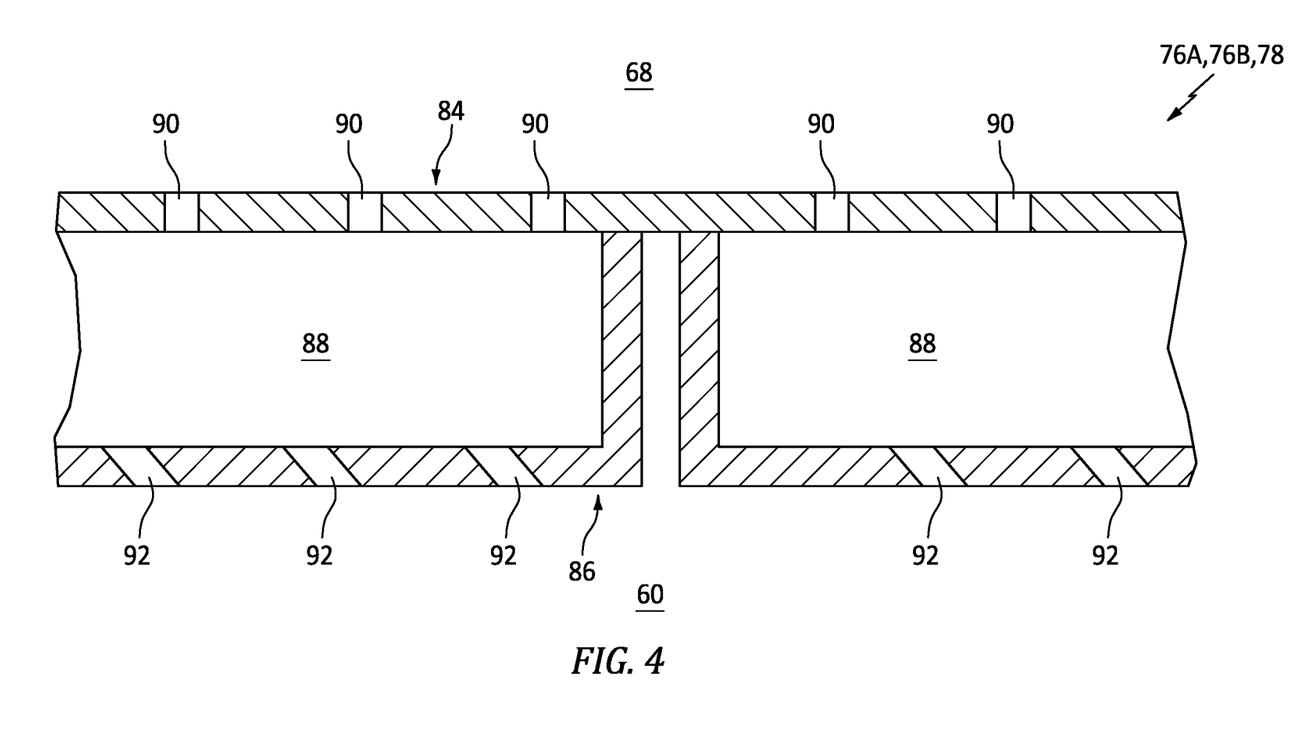
FIG. 4 is a partial sectional illustration of a combustor wall.

Referring to FIG. 4, any one or more or all of the walls 76A, 76B, 78 may each be configured as a multi-walled structure; e.g., a hollow, dual-walled structure. Each wall 76A, 76B, 78 of FIG. 4, for example, includes a combustor wall shell 84, a combustor wall heat shield 86 (e.g., a liner) and one or more combustor wall cooling cavities 88 (e.g., impingement cavities) formed by and (e.g., radially and/or axially) between the shell 84 and the heat shield 86. Each cooling cavity 88 of FIG. 4 is fluidly coupled with the diffuser plenum 68 through one or more cooling apertures 90 in the shell 84; e.g., impingement apertures. Each cooling cavity 88 of FIG. 4 is fluidly coupled with the combustion chamber 60 through one or more cooling apertures 92 in the heat shield 86; e.g., effusion apertures. Of course, various other multi-walled combustor wall structures are known in the art, and the present disclosure is not limited to any particular ones thereof. Furthermore, it is contemplated any one or more or all of the walls 76A, 76B and/or 78 of FIG. 2 may each alternatively be configured as a single-walled structure. The shell 84 of FIG. 4, for example, may be omitted and the heat shield 86 may form a single walled liner/wall. However, for ease of description, each wall 76A, 76B, 78 may each be described below as the hollow, dual-walled structure.

Figure 5:
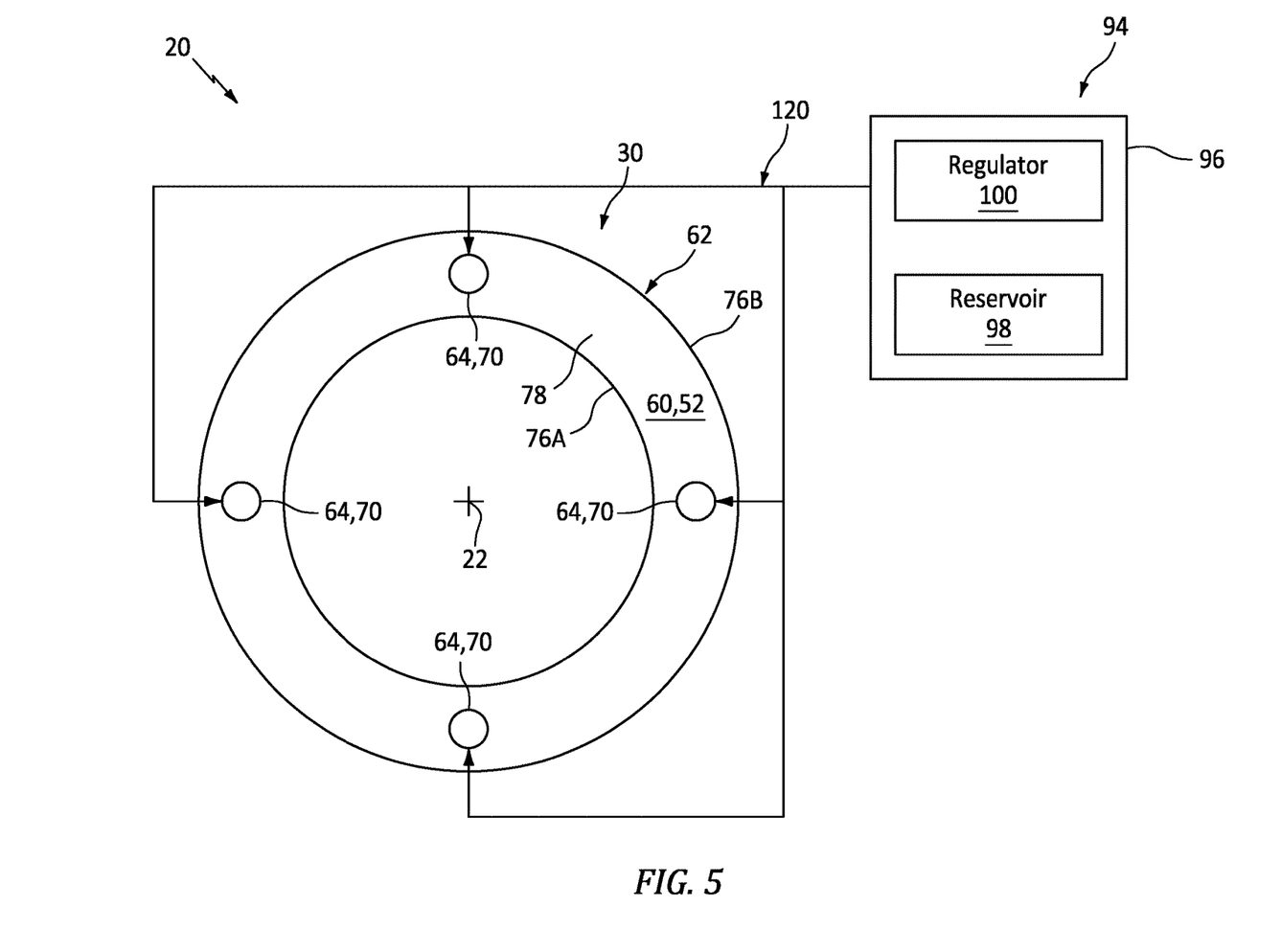
FIG. 5 is a schematic illustration of a fuel system configured with the combustor section.

Referring to FIG. 5, the turbine engine 20 includes a fuel system 94 for delivering the fuel to the combustor 62. This fuel system 94 includes a fuel source 96 and the one or more fuel injectors 70. The fuel source 96 of FIG. 5 includes a fuel reservoir 98 and/or a fuel flow regulator 100; e.g., a valve and/or a pump. The fuel reservoir 98 is configured to store the fuel before, during and/or after turbine engine operation. The fuel reservoir 98, for example, may be configured as or otherwise include a tank, a cylinder, a pressure vessel, a bladder or any other type of fuel storage container. The fuel flow regulator 100 is configured to direct and/or meter a flow of the fuel from the fuel reservoir 98 to one or more or all of the fuel injectors 70. The fuel injectors 70 may be arranged circumferentially about the axial centerline 22 in an array. Each fuel injector 70 is configured to direct the fuel received from the fuel source 96 into the combustion chamber 60 for combustion.

The fuel delivered by the fuel system 94 may be a non-hydrocarbon fuel; e.g., a hydrocarbon free fuel. Examples of the non-hydrocarbon fuel include, but are not limited to, hydrogen fuel (e.g., hydrogen ($H_2$) gas) and ammonia fuel (e.g., ammonia ($NH_3$) gas). The turbine engine 20 of FIG. 1 may thereby be configured as a non-hydrocarbon turbine engine; e.g., a hydrocarbon free turbine engine. The present disclosure, however, is not limited to non-hydrocarbon turbine engines. The fuel delivered by the fuel system 94, for example, may alternatively be a hydrocarbon fuel such as, but not limited to, kerosene or jet fuel. The turbine engine 20 of FIG. 1 may thereby be configured as a hydrocarbon turbine engine. Alternatively, the fuel system 94 may be configured as a multi-fuel system operable to deliver, individually or in combination, multiple different fuels (e.g., a non-hydrocarbon fuel and a hydrocarbon fuel, etc.) for combustion within the combustion chamber 60. The turbine engine 20 of FIG. 1 may thereby be configured as a multi-fuel turbine engine; e.g., a dual-fuel turbine engine. However, for ease of description, the fuel delivered by the fuel system 94 may be described below as the non-hydrocarbon fuel; e.g., the hydrogen fuel.

Figure 6:
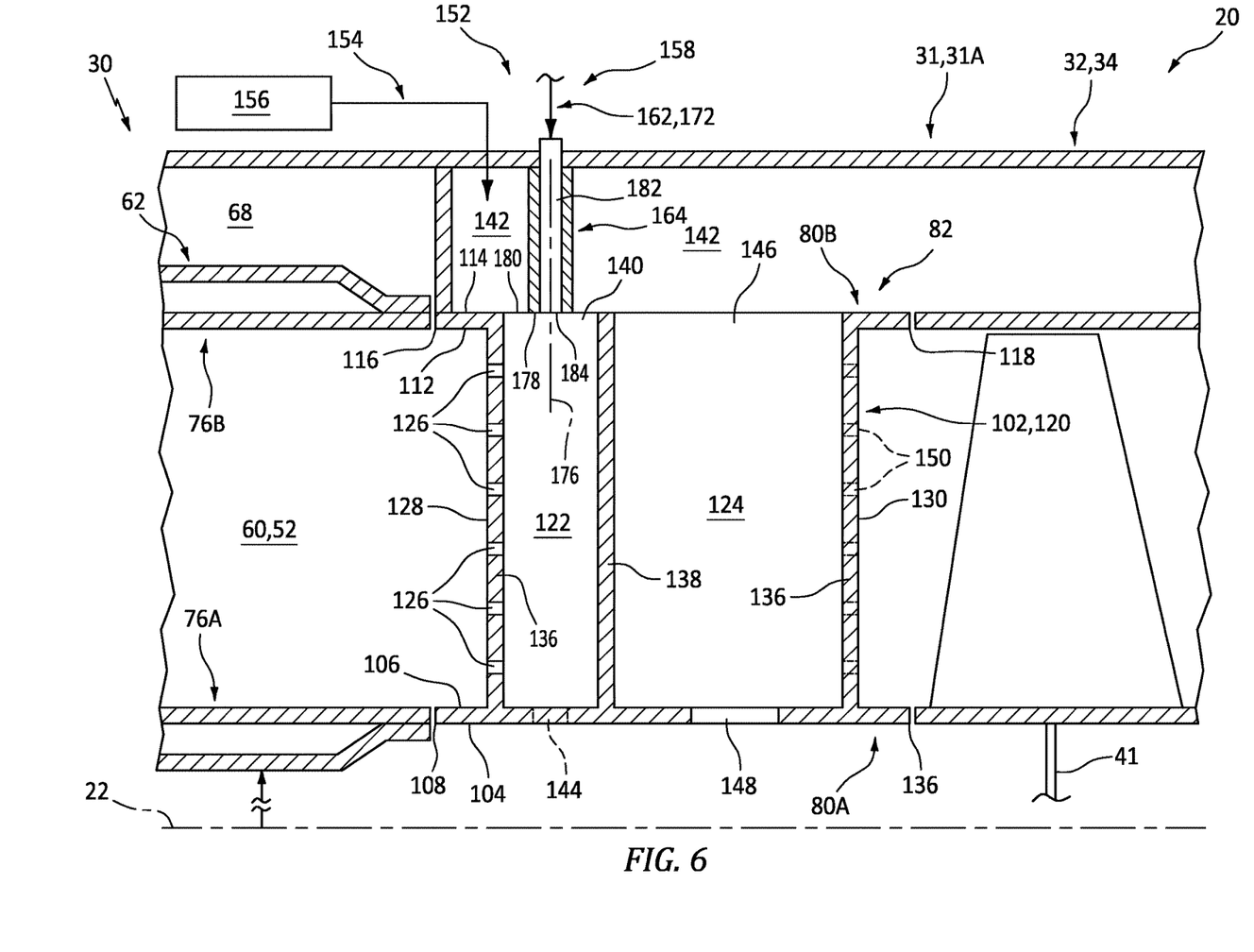
FIG. 6 is a partial sectional illustration of the turbine engine at a stator vane array between the combustor and a high pressure turbine rotor.

Referring to FIG. 6, the stator vane array 82 may be configured as a first turbine vane array in the turbine section 31. The stator vane array 82 of FIG. 6, for example, is disposed at (e.g., on, adjacent or proximate) an outlet from the combustion chamber 60 at a downstream end of the combustor 62/an inlet to the turbine section 31. The stator vane array 82 is arranged along the core flowpath 52 and/or along the axial centerline 22 between the combustor 62 and a first stage of the HPT rotor 41. The stator vane array 82 is configured to turn and/or otherwise condition the combustion products exhausted from the combustion chamber 60 for interacting with the HPT rotor 41 and its first stage. The stator vane array 82 of FIG. 6 includes the inner platform 80A, the outer platform 80B and a plurality of stator vanes 102; e.g., hollow turbine vanes.

Figure 7:
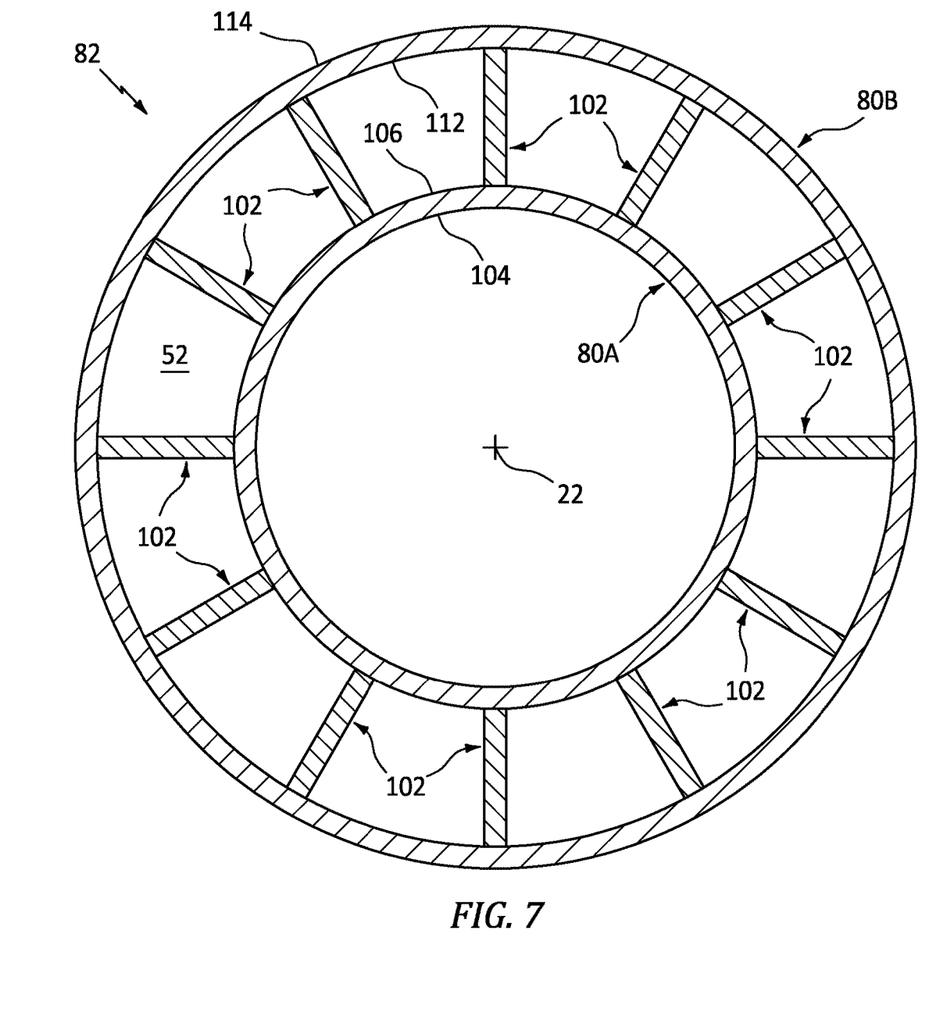
FIG. 7 is a schematic cross-sectional illustration of the stator vane array.

Referring to FIG. 7, the inner platform 80A extends circumferentially about (e.g., completely around) the axial centerline 22, which axial centerline 22 may also be an axial centerline of the inner platform 80A. The inner platform 80A extends radially between and to an inner side 104 of the inner platform 80A and an outer side 106 of the inner platform 80A. At the inner platform outer side 106, the inner platform 80A of FIG. 6 forms a radial inner peripheral boundary of the core flowpath 52 longitudinally within (and through) the stator vane array 82. The inner platform 80A extends longitudinally along the core flowpath 52 (e.g., axially along the axial centerline 22) between and to an upstream end 108 of the inner platform 80A and a downstream end 110 of the inner platform 80A.

The outer platform 80B of FIG. 7 extends circumferentially about (e.g., completely around) the axial centerline 22, which axial centerline 22 may also be an axial centerline of the outer platform 80B. The outer platform 80B extends radially between and to an inner side 112 of the outer platform 80B and an outer side 114 of the outer platform 80B. At the outer platform inner side 112, the outer platform 80B of FIG. 6 forms a radial outer peripheral boundary of the core flowpath 52 longitudinally within (and through) the stator vane array 82. The outer platform 80B extends longitudinally along the core flowpath 52 (e.g., axially along the axial centerline 22) between and to an upstream end 116 of the outer platform 80B and a downstream end 118 of the outer platform 80B.

The outer platform 80B of FIG. 6 is spaced radially outboard of the inner platform 80A. The outer platform 80B is longitudinally aligned with and/or longitudinally (e.g., axially) overlaps at least a portion or an entirety of the inner platform 80B, and vice versa. Referring to FIG. 7, the outer platform 80B circumscribes the inner platform 80A. With this arrangement, the core flowpath 52 may have an annular geometry when viewed, for example, in a first reference plane perpendicular to the axial centerline 22.

The stator vanes 102 are distributed circumferentially about the axial centerline 22 in a (e.g., circular) array, which axial centerline 22 may also be an axial centerline of the array of stator vanes 102. The stator vanes 102 are arranged within the core flowpath 52. Each stator vane 102 of FIG. 7, for example, extends (e.g., radially) between and to the inner platform 80A and the outer platform 80B. Each stator vane 102 is also connected to (e.g., formed integral with or otherwise fixedly attached to) the inner platform 80A and/or the outer platform 80B. With this arrangement, each stator vane 102 extends (e.g., generally radially) across the core flowpath 52 from the inner platform 80A to the outer platform 80B.

Figure 8:
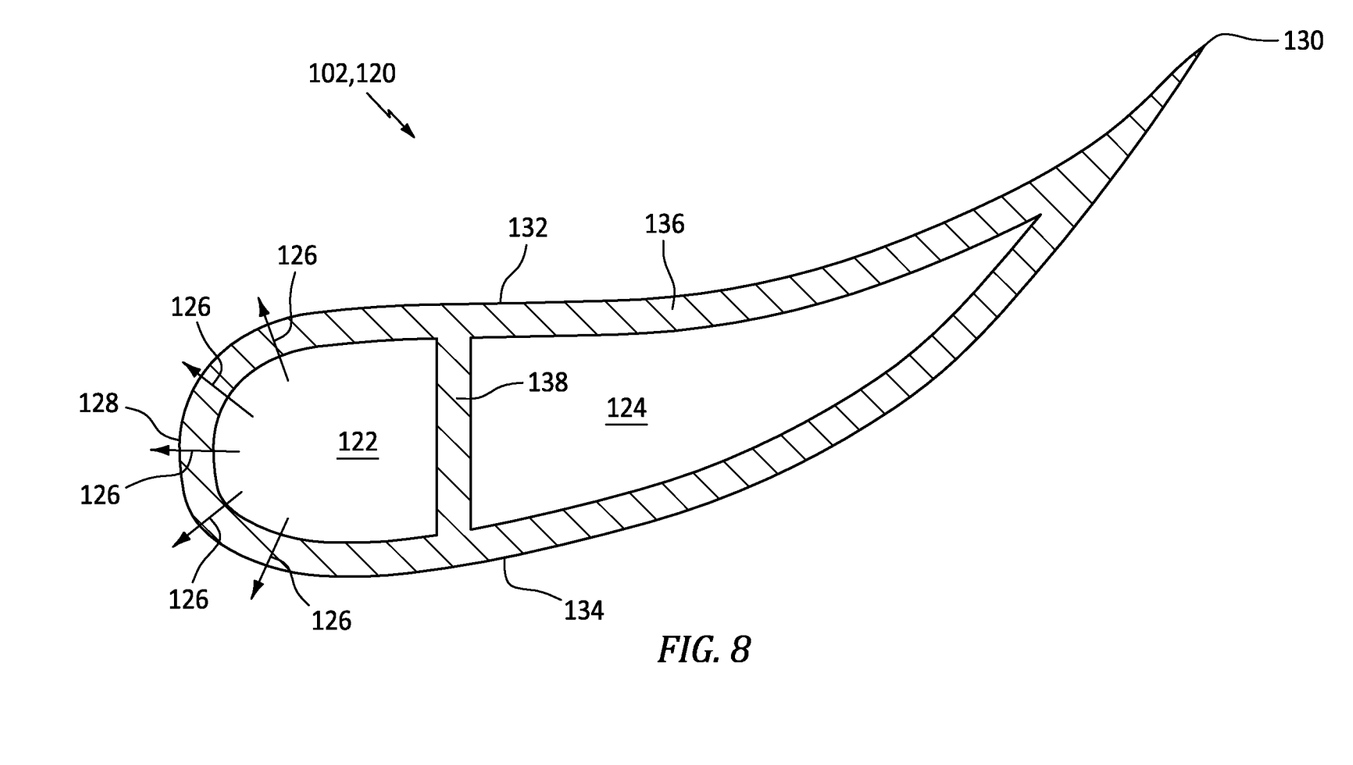
FIG. 8 is a cross-sectional illustration of a stator vane.

Referring to FIG. 6, each stator vane 102 includes a vane airfoil 120, one or more internal cooling passages 122 and 124 and one or more cooling apertures 126. The vane airfoil 120 extends spanwise (e.g., radially) between and to the inner platform 80A and the outer platform 80B. The vane airfoil 120 extends longitudinally (e.g., chordwise, generally axially) between and to a leading edge 128 of the respective stator vane 102 and a trailing edge 130 of the respective stator vane 102. Referring to FIG. 8, the vane airfoil 120 extends laterally (e.g., generally circumferentially) between and to opposing lateral sides 132 and 134 of the vane airfoil 120. The first airfoil side 132 may be concave and configured as a pressure side of the vane airfoil 120. The second airfoil side 134 may be convex and configured as a suction side of the vane airfoil 120. Each of these airfoil sides 132 and 134 extends longitudinally between and may meet at the leading edge 128 and the trailing edge 130.

The stator vane 102 and its vane airfoil 120 of FIG. 8 include a tubular sidewall 136 and an internal divider 138. The sidewall 136 may form an exterior of the stator vane 102 and its vane airfoil 120. The sidewall 136 of FIG. 8, for example, includes an exterior surface of the vane airfoil 120 that forms the leading edge 128, the trailing edge 130 and the airfoil sides 132 and 134. The divider 138 is disposed within an internal cavity of the sidewall 136. This divider 138 extends laterally across the internal cavity between opposing side portions of the sidewall 136. The divider 138 may thereby divide the internal cavity into the first passage 122 and the second passage 124. The divider 138 of FIG. 8 may be longitudinally aligned with (or upstream of) a throat of the stator vane array 82. Referring to FIG. 6, the divider 138 may extend spanwise along an entire length of the vane airfoil 120. The divider 138 may thereby fluidly separate the first passage 122 from the second passage 124 within the stator vane 102 and its vane airfoil 120.

The first passage 122 may be arranged at the leading edge 128. The second passage 124 may be arranged at the trailing edge 130. With this arrangement, the first passage 122 is disposed longitudinally between the leading edge 128 and the second passage 124. The second passage 124 is disposed longitudinally between the first passage 122 and the trailing edge 130. More particularly, the first passage 122 of FIG. 6 extends longitudinally within the vane airfoil 120 between and to a leading edge portion of the sidewall 136 and the divider 138. The second passage 124 of FIG. 6 extends longitudinally within the vane airfoil 120 between and to a trailing edge portion of the sidewall 136 and the divider 138. Referring to FIG. 8, each internal passage 122, 124 may extend laterally within the vane airfoil 120 between the opposing side portions of the sidewall 136.

Referring to FIG. 6, the first passage 122 projects spanwise into the stator vane array 82 and the respective stator vane 102 from an inlet 140 into the first passage 122. This first passage inlet 140 may be formed by a port (e.g., an opening) through the outer platform 80B. The first passage inlet 140 may thereby fluidly couple the first passage 122 to an air plenum 142 radially outboard of the outer platform 80B. The first passage 122 is also fluidly coupled with the core flowpath 52 through, for example, the cooling apertures 126. In particular, each cooling aperture 126 extends through the sidewall 136 from the first passage 122 to the core flowpath 52. The cooling apertures 126 may thereby collectively form an outlet from the first passage 122. Here, the cooling apertures 126 are arranged along and about the leading edge portion of the sidewall 136. However, in other embodiments, it is contemplated the first passage outlet may also or alternatively be formed by a port 144 in the inner platform 80B where, for example, the first passage 122 is fluidly coupled with one or more other turbine engine components.

The second passage 124 projects spanwise into the stator vane array 82 and the respective stator vane 102 from an inlet 146 into the second passage 124. This second passage inlet 146 may be formed by another port (e.g., an opening) through the outer platform 80B. The second passage inlet 146 may thereby fluidly couple the second passage 124 to the air plenum 142. The second passage 124 is also fluidly coupled with one or more other turbine engine components through an outlet 148 from the second passage 124. This second passage outlet 148 may be formed by a port in the inner platform 80A. However, in other embodiments, it is contemplated the second passage outlet may also or alternatively be formed by one or more additional cooling apertures 150 through the sidewall 136.

The air plenum 142 of FIG. 6 is formed by and extends radially between (a) the stator vane array 82 and its outer platform 80B and (b) another structure of the turbine engine 20 such as, but not limited to, the inner case 34 or an outer cooling air duct wall. The air plenum 142 may extend axially along the stator vane array 82 and its outer platform 80B. The air plenum 142 may extend circumferentially about (e.g., completely around, circumscribe) the stator vane array 82 and its outer platform 80B. The air plenum 142 may thereby be configured as an annulus adjacent and radially outboard of the passage inlets 140 and 146. It is contemplated, however, the air plenum 142 may alternatively be configured into a plurality of arcuate segments, where each segment may overlap and be fluidly coupled with the internal cooling passages 122 and 124 in one or more of the stator vanes 102.

During turbine engine operation, the stator vane array 82 and its stator vanes 102 are subject to the relatively hot combustion products flowing out of the combustion chamber 60 into the HPT section 31A. The turbine engine 20 therefore include a cooling system 152 for cooling (e.g., transferring heat energy out of) the stator vane array 82 and its stator vanes 102. The cooling system 152 of FIG. 6 includes an air cooling circuit 154, the air plenum 142 and the internal cooling passages 122 and 124. The air cooling circuit 154 receives cooling air from a cooling air source 156, and routes the cooling air to the air plenum 142. The air plenum 142 (e.g., functioning as a manifold) distributes the cooling air received from the air cooling circuit 154 to the internal cooling passages 122 and 124. The cooling system 152 is thereby configured to direct cooling fluid (here, the cooling air) into each of the internal cooling passages 122 and 124 from the cooling air source 156 to cool the stator vane array 82 and its stator vanes 102. The cooling air source 156 may be the combustor section 30 where, for example, the cooling air is bled from the diffuser plenum 68 or elsewhere upstream of the combustion chamber 60. Of course, various other cooling air sources are known in the art, and the present disclosure is not limited to any particular ones thereof.

Figure 9:
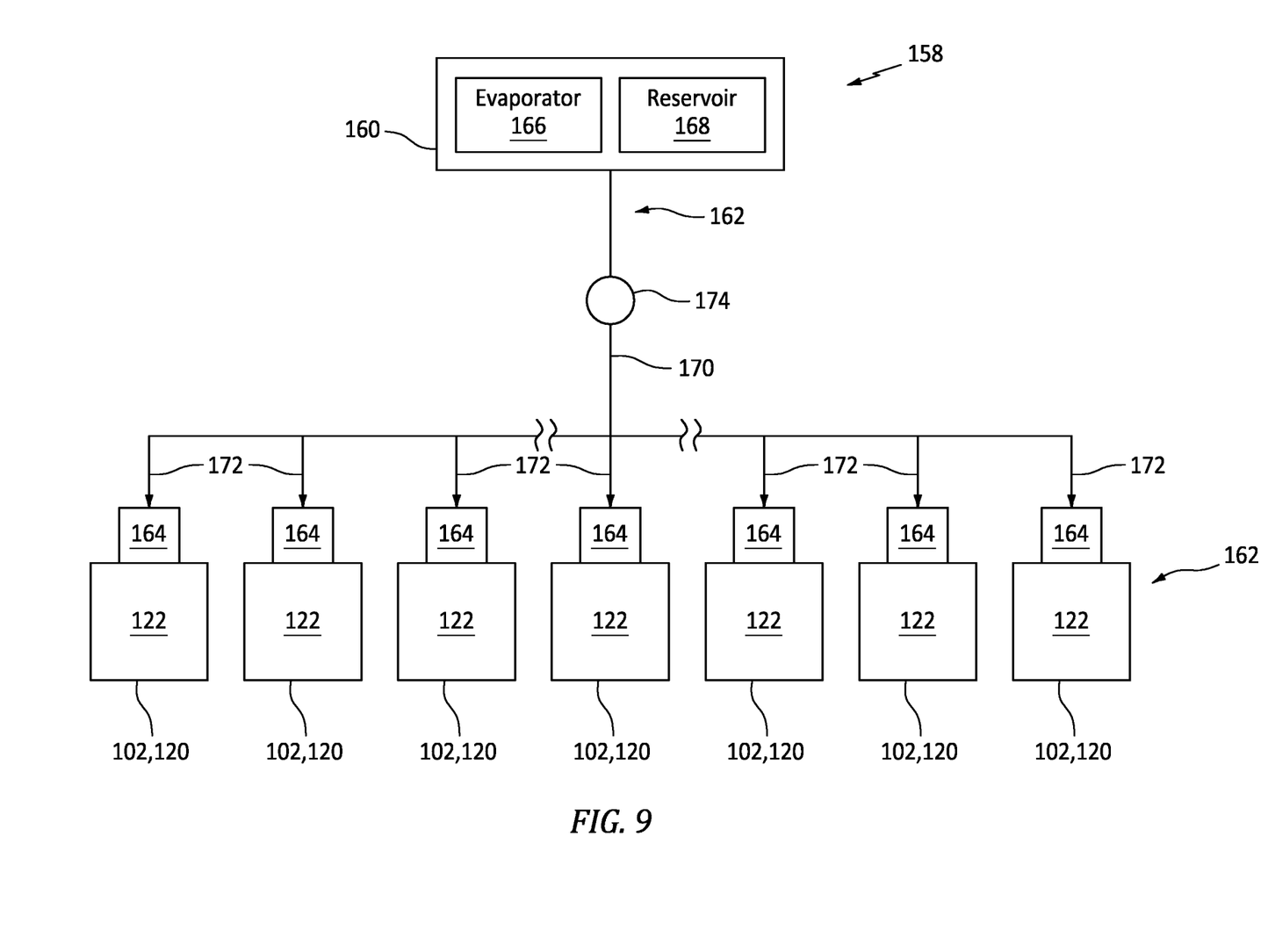
FIG. 9 is a schematic illustration of a steam system arranged with the stator vane array.

Combustion product temperatures may continue to increase in an effort to improve engine efficiency and/or facilitate improved turbine engine performance, particularly when using alternative fuels such as hydrogen fuel or the like. However, bleeding additional air from the core flowpath 52 (or otherwise) to provide additional cooling may be counterproductive since that bleed air is no longer primarily used for the combustion process. The cooling system 152 therefore also includes a steam system 158 as shown in FIG. 9 to provide supplemental cooling for at least the stator vane array 82 and its stator vanes 102. This steam system 158 includes a steam source 160, a steam delivery circuit 162 and one or more steam injectors 164, where each of the steam injectors 164 may be associated with a respective one of the first passages 122.

The steam source 160 is configured to provide the steam to the steam delivery circuit 162 during turbine engine operation and, more particularly, during steam system operation. The steam source 160, for example, may be configured as or otherwise include an evaporator 166, which may be or otherwise include a fluid-to-fluid heat exchanger and/or an electrical heater. The evaporator 166 is configured to evaporate water into the steam during steam system operation. The water may be received from various sources. The steam source 160 of FIG. 9, for example, includes a water reservoir 168 fluidly coupled with and upstream of the evaporator 166. This water reservoir 168 is configured to store the water before, during and/or after turbine engine operation. Examples of the water reservoir 168 include, but are not limited to, a tank, a cylinder, a pressure vessel, a bladder or any other type of water storage container. Briefly, the water may be supplied to the water reservoir 168 by recovering water vapor from the combustion products flowing through the core flowpath 52 (see FIG. 1) and/or from another water source onboard or offboard an aircraft.

The steam delivery circuit 162 of FIG. 9 includes a supply circuit 170 and one or more feed circuits 172, where each feed circuit 172 is associated with a respective one of the steam injectors 164. The supply circuit 170 of FIG. 9 extends from an outlet from the steam source 160 to an interface with the respective feed circuits 172 such as a manifold. At the interface, the feed circuits 172 may be fluidly coupled in parallel to and downstream of the supply circuit 170. Each of the feed circuits 172 extends from the interface to an inlet of a respective one of the steam injectors 164. The steam delivery circuit 162 thereby fluidly couples the steam source 160 to the respective steam injectors 164.

The steam directed through the steam delivery circuit 162 may be regulated based on cooling needs for the stator vane array 82 and/or based on a mode of turbine engine operation. The steam delivery circuit 162 of FIG. 9, for example, includes a steam flow regulator 174. The steam flow regulator 174 is arranged (e.g., fluidly coupled inline) with the supply circuit 170. The steam flow regulator 174 is configured to selectively direct and/or meter a flow of the steam from the steam source 160 to the steam injectors 164. For example, the steam flow regulator 174 may be configured as or otherwise include a control valve. This control valve may fully open, may fully close and/or may move to one or more partially open positions. While the steam flow regulator 174 is illustrated in FIG. 9 as being part of the supply circuit 170, that steam flow regulator 174 may alternatively be arranged at the interface between the supply circuit 170 and the feed circuits 172, at an inlet to the supply circuit 170, or otherwise. One or more or all of the feed circuits 172 may also or alternatively be provided with its own steam flow regulator 174. Furthermore, it is contemplated the steam delivered to one or more or all of the steam injectors 164 may still also or alternatively be regulated by adjusting an amount of steam provided (e.g., produced) by the steam source 160.

Referring to FIG. 6, each steam injector 164 is arranged with a respective one of the first passages 122. Each steam injector 164 of FIG. 6, for example, extends axially along a centerline axis 176 of the respective steam injector 164 (e.g., radially inward relative to the axial centerline 22) to a tip 178 of the respective steam injector 164. This injector tip 178 may be disposed at the respective first passage inlet 140. The injector tip 178, for example, may be axially aligned with (or slightly above or below) the respective first passage inlet 140 along the centerline axis 176. However, a gap 180 is still provided into the respective first passage 122 along the steam injector 164 to maintain the fluid coupling between the air plenum 142 and the respective first passage 122. Here, the gap 180 is an annulus that extends along and circumscribes the steam injector 164. The gap 180, however, may alternatively be a (e.g., arcuate) slot or other aperture where, for example, the steam injector 164 is disposed to a side of the first passage inlet 140.

The steam injector 164 of FIG. 6 includes an internal steam passage 182 and at least (or only) one outlet 184 from the steam passage 182. The steam passage 182 extends axially along the centerline axis 176 within the steam injector 164 to its steam passage outlet 184 at the injector tip 178. The steam passage 182 is fluidly coupled with and downstream of a respective one of the feed circuits 172. The steam injector 164 of FIG. 6 is configured to direct steam received from the feed circuit 172 out of the steam passage outlet 184 and into the respective first passage 122 (e.g., through the first passage inlet 140). The steam may be directed out of the steam injector 164 and its steam passage outlet 184 as a jet of the steam, or as a diffuse flow of the steam.

With the foregoing arrangement, the cooling system 152 may direct a first cooling fluid ("first fluid") into each first passage 122 and a second cooling fluid ("second fluid") into each second passage 124. The second fluid may be different than the first fluid during one or more modes of turbine engine operation. For example, when the turbine engine 20 is operating at medium throttle or high throttle (e.g., for aircraft cruise or aircraft takeoff), the first fluid may include both the cooling air and a select quantity of the steam. The second fluid on the other hand may only or primarily (e.g., due to slight leakage out of the first passage 122 via the air plenum 142) include the cooling air; e.g., with very little or no steam. However, the second fluid may be the same as the first fluid during one or more other modes of turbine engine operation. For example, when the turbine engine 20 is operating at low throttle or idle (e.g., during engine warmup, engine cooldown or for aircraft descent), both the first fluid and the second fluid may only or primarily include the cooling air; e.g., the steam to the feed circuits 172 may be shut off. With this operability, the cooling system 152 may provide additional cooling capability using the steam as needed, but regularly provide the air cooling throughout the engine cycle. Note, providing air cooling may be particularly useful at turbine engine startup where, for example, the steam may not be available until after the turbine engine 20 is warmed up.

Figure 10:
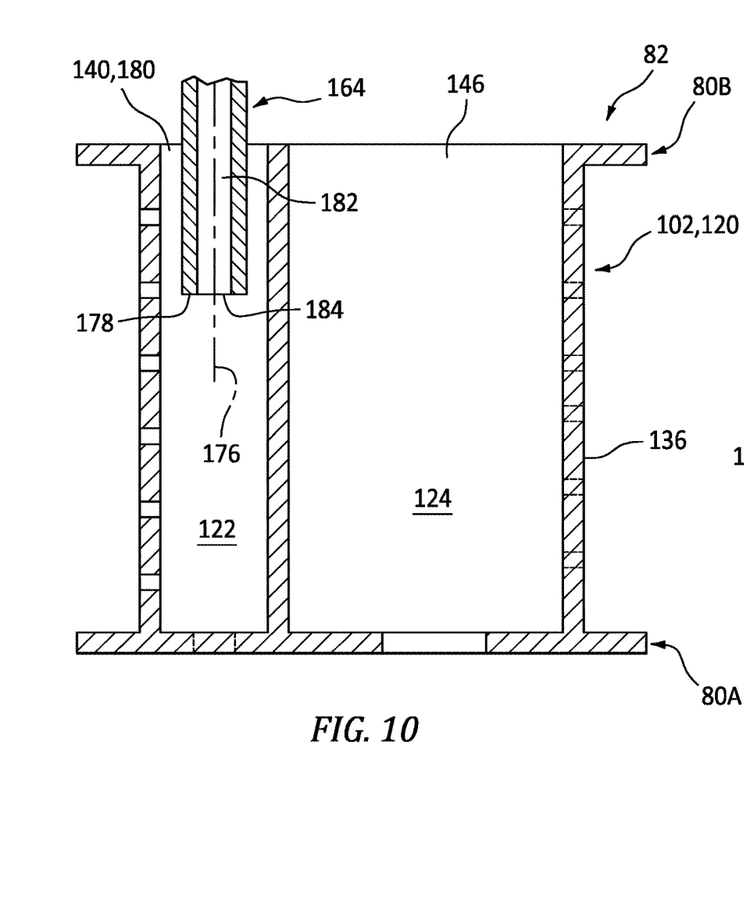
FIGS. 10-12 are partial sectional illustrations of the stator vane arranged with various steam injectors.
Figure 11:
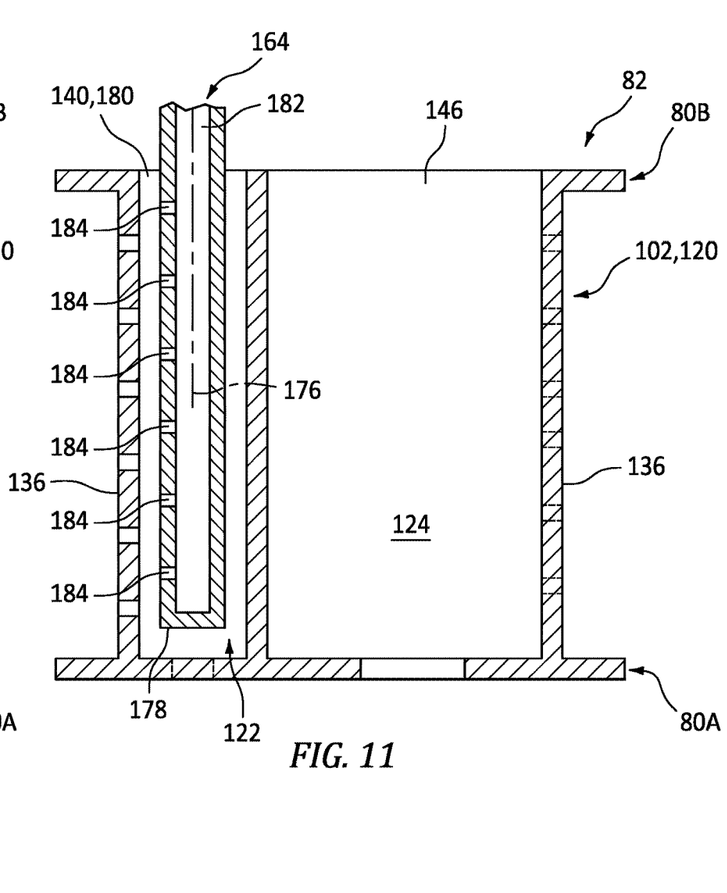

In some embodiments, referring to FIGS. 10 and 11, one or more each steam injector 164 may project axially along its centerline axis 176 (e.g., radially) through the respective first passage inlet 140 and partially into the first passage 122. The steam injector 164 of FIG. 10, for example, is configured as a steam stinger. The steam injector 164 of FIG. 11, for example, is configured as a steam rail.

In some embodiments, referring to FIGS. 6 and 10, one or more or each steam injector 164 may be configured with its steam passage outlet 184 (or outlets) at the injector tip 178. In other embodiments, referring to FIG. 11, the steam passage outlet(s) 184 may be disposed along a length of the respective steam injector 164. With such an arrangement, the steam may be delivered to multiple zones along a span of the respective stator vane 102. In addition, the steam may be directed out of the steam injector 164 to impinge against the respective sidewall 136 to further enhance the steam cooling capability.

Figure 12:
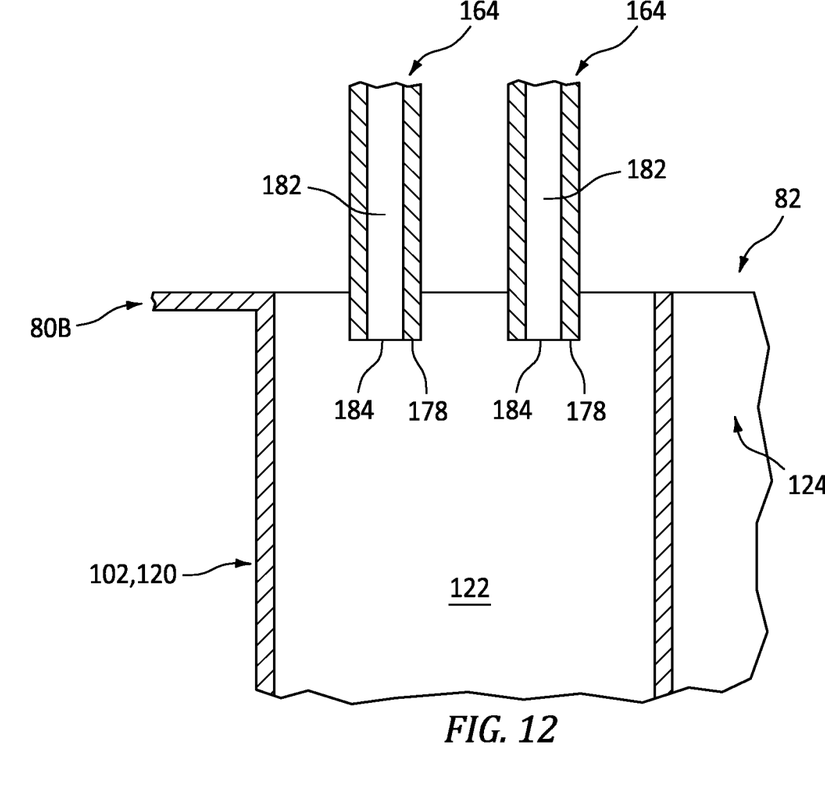
Figure 13:
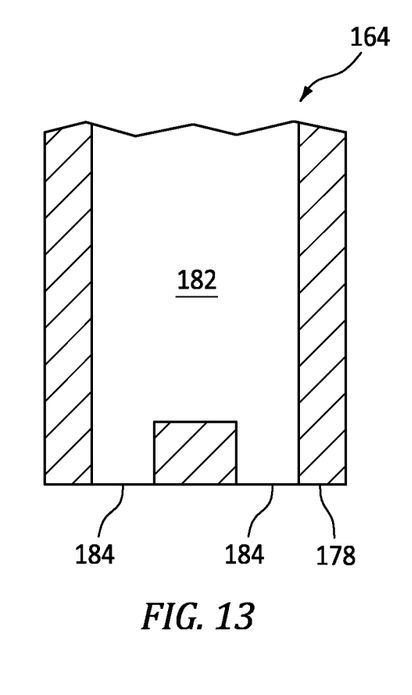
FIG. 13 is a partial sectional illustration of a steam injector with multiple outlets.

In some embodiments, referring to FIG. 9 (see also FIGS. 6, 10 and 11), each first passage 122 may be associated with a single one of the steam injectors 164. In other embodiments, referring to FIG. 12, one or more or each first passage 122 may be associated with multiple of the steam injectors 164. Each of the steam injectors 164 of FIG. 12, for example, may be arranged with and configured to independently direct the steam into the respective first passage 122. In addition or alternatively, while the steam injectors 164 of FIGS. 6, 10 and 12 are shown with a single steam passage outlet 184, it is contemplated any one of these steam injectors 164 may alternatively include multiple steam passage outlets 184 to provide further targeted and/or diffuse steam injection; e.g., see FIG. 13.

The cooling system 152 may be included in various turbine engines other than the one described above. The cooling system 152, for example, may be included in a geared turbine engine where a geartrain connects one or more shafts to one or more rotors in a fan section, a compressor section and/or any other engine section. Alternatively, the cooling system 152 may be included in a turbine engine configured without a geartrain; e.g., a direct drive turbine engine. The cooling system 152 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
an air source;
a steam source;
a turbine vane array including an inner platform, an outer platform and a plurality of turbine vanes extending between and connected to the inner platform and the outer platform, the plurality of turbine vanes comprising a first turbine vane, and the first turbine vane including a first passage and a second passage;
an air plenum disposed radially outboard of and formed by the outer platform;
a cooling system configured to direct a first flow into an interior of the first passage and a second flow into the second passage, the cooling system including a steam injector projecting into the first passage, the steam injector spaced from a sidewall of the first passage and forming an annulus circumscribing the steam injector, the annulus fluidly coupling the air plenum with the first passage, the cooling system configured to direct the steam from the steam source into the first passage through the steam injector, the cooling system configured to direct the air into the first passage through the air plenum, and wherein, during a first mode, the first flow comprises a mixture of air from the air source and steam from the steam source, and the second flow comprises the air from the air source without the steam from the steam source;
wherein during operation of the assembly in the first mode, the cooling system directs the first flow into the interior of the first passage.

2. The assembly of claim 1, wherein during a second mode, the first flow comprises the air from the air source without the steam from the steam source; and the second flow comprises the air from the air source without the steam from the steam source.

3. The assembly of claim 1, wherein
the steam injector is configured as a steam rail extending within the first passage; and
the cooling system is configured to direct the steam from the steam source into the first passage through the steam rail.

4. The assembly of claim 1, wherein
the cooling system includes a plurality of steam injectors; and
the cooling system is configured to direct the steam from the steam source into the first passage through the plurality of steam injectors.

5. The assembly of claim 1, wherein the cooling system is configured to direct the air from the air source into the second passage through the air plenum.

6. The assembly of claim 1, wherein
the first turbine vane extends longitudinally between a leading edge and a trailing edge; and
the first passage is arranged at the leading edge.

7. The assembly of claim 1, wherein
the first turbine vane extends longitudinally between a leading edge and a trailing edge; and
the second passage is arranged at the trailing edge.

8. The assembly of claim 1, wherein
the first turbine vane extends longitudinally between a leading edge and a trailing edge; and
the first passage is disposed longitudinally between the leading edge and the second passage.

9. The assembly of claim 1, wherein the first passage is fluidly discrete from the second passage within the first turbine vane.

10. The assembly of claim 1, wherein the first passage is fluidly coupled with a plurality of cooling apertures through a sidewall of the first turbine vane.

11. The assembly of claim 1, further comprising:
a combustor comprising a combustion chamber;
the turbine vane array arranged at an outlet from the combustion chamber; and the air source comprising a diffuser plenum next to the combustor.

12. The assembly of claim 1, wherein
the inner platform forms an inner peripheral boundary of a flowpath through the turbine vane array;
the outer platform forms an outer peripheral boundary of the flowpath through the turbine vane array; and
each of the plurality of turbine vanes extends across the flowpath between the inner platform and the outer platform.

13. An assembly for a turbine engine, comprising:
a turbine vane array including an inner platform, an outer platform and a plurality of turbine vanes extending between and connected to the inner platform and the outer platform, the plurality of turbine vanes comprising a first turbine vane, the first turbine vane including a sidewall, a passage and a plurality of cooling apertures, the passage extending within the first turbine vane along the sidewall, and the plurality of cooling apertures extending through the sidewall and fluidly coupled with the passage;
a structure forming an air plenum with the outer platform, the air plenum radially outboard of the outer platform and fluidly coupled with the passage through an inlet to the passage in the outer platform; and
a steam injector configured to direct steam into the passage, a tip of the steam injector disposed at the inlet to the passage such that the tip of the steam injector is disposed a first radial distance from the outer platform and a second radial distance from the inner platform that is greater than the first radial distance, and the tip disposed at the inlet axially offset from the sidewall forming a gap, the gap fluidly coupling the air plenum with the passage.

14. The assembly of claim 13, wherein
the passage is a first passage, and the first turbine vane further includes a second passage discrete from the first passage; and
the air plenum is fluidly coupled with the second passage through an inlet to the second passage in the outer platform.

15. The assembly of claim 13, further comprising:
a turbine section;
the turbine vane array arranged at an inlet to the turbine section.

16. An assembly for a turbine engine, comprising:
a steam source;
a diffuser plenum;
a combustor comprising a combustion chamber, the combustor disposed in the diffuser plenum;
a vane array arranged at an outlet from the combustion chamber, the vane array including an inner platform, an outer platform and a plurality of vanes, the inner platform forming an inner peripheral boundary of a flowpath through the vane array, the outer platform forming an outer peripheral boundary of the flowpath through the vane array, each of the plurality of vanes extending across the flowpath from the inner platform to the outer platform, and the plurality of vanes comprising a first vane with an internal passage;
an air plenum radially outboard of the outer platform and fluidly coupled with an interior of the internal passage; and
a cooling system configured to direct a fluid into the interior of the internal passage, the cooling system including a steam injector configured to direct steam into the interior of the internal passage, the steam injector disposed at an inlet to the interior of the internal passage and forming an annulus circumscribing the steam injector, and the annulus fluidly coupling the air plenum with the interior of the internal passage;
wherein during a first mode of operation, the cooling system directs the fluid into the interior of the internal passage, the fluid comprising both air from the diffuser plenum and steam from the steam source.

17. The assembly of claim 16, wherein during a second mode of operation, the cooling system directs a second fluid into the internal passage, the second fluid comprising the air from the diffuser plenum.

\* \* \* \* \*